Sept. 12, 1933.  H. W. LORMOR ET AL  1,926,157
STORAGE BATTERY UNIT
Filed Jan. 20, 1930

Inventors.
Henry W. Lormor
Leon A. Marshall
Kwis Hudson & Kent
attys

Sept. 12, 1933.  L. W. MACOMBER  1,926,158
LUBRICATING HEAD
Filed Sept. 20, 1928
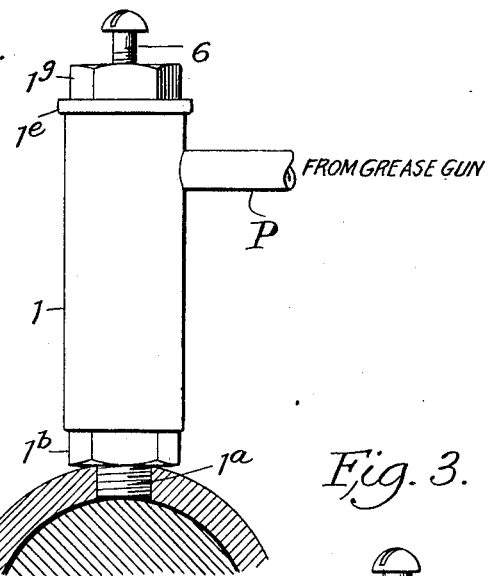
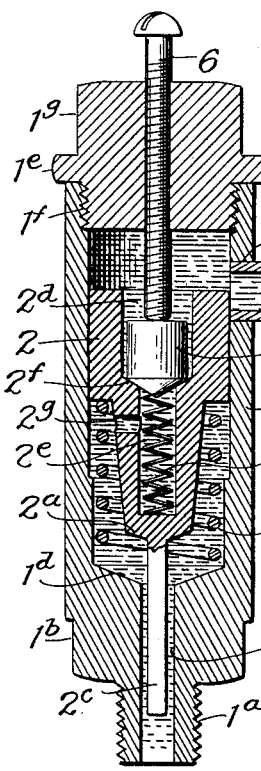
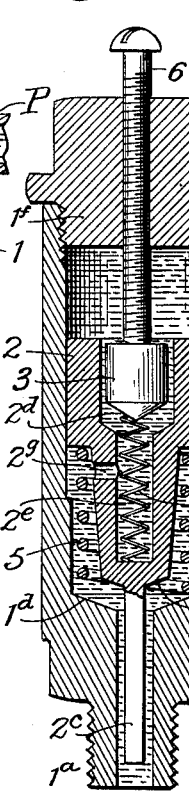
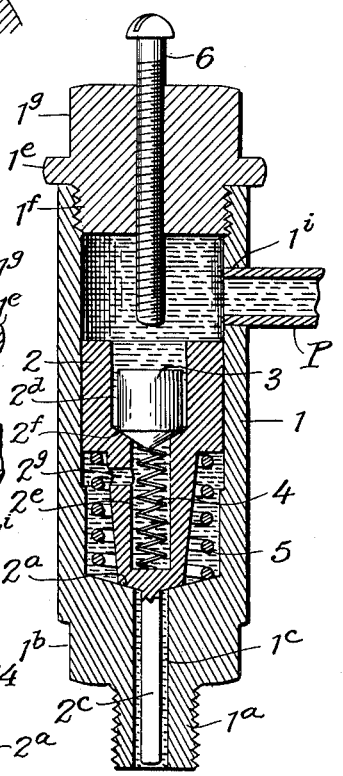
INVENTOR.
Lynn W. Macomber
BY
Alexander & Dowell
ATTORNEYS Patented Sept. 12, 1933

1,926,158

UNITED STATES PATENT OFFICE 1,926,158

LUBRICATING HEAD

Lynn W. Macomber, Battle Creek, Mich.

Application September 20, 1928
Serial No. 307,267

11 Claims. (Cl. 184—7)

This invention is a novel lubricating head for use in lubricating bearings or moving parts of an automobile or other machine and particularly designed for use in such machines wherein a number of bearings are to be simultaneously oiled from one pressure supply or pressure gun.

The object of the invention is to provide a lubricating head with a regulating device whereby a predetermined amount of oil may be supplied to the bearing or point to be lubricated and to which the head is attached regardless of the amount of pressure applied by the supply gun, or the length of time such pressure is applied.

In my invention each head is provided with adjustable means whereby the desired quantity of oil for the particular bearing or point to which the head is applied can be supplied, regardless of the amount or time of pressure from the supply source. By my invention each bearing or oiling point can be supplied with exactly that amount of oil which it requires at each operation of the gun or central supply device—whereas with the present used devices which are not provided with adjusting or regulating means, some bearings or points will be insufficiently supplied with oil and others will be over supplied.

The accompanying drawing illustrates one practical embodiment of the invention and I will explain the invention with reference to said drawing to enable others to readily understand and use the invention. In the claims I have summarized the essentials of the invention and novel features of construction and novel combinations of parts for which protection is desired.

In said drawing:

Fig. 4 is a similar view showing the parts returning to normal position when the pressure is released.

Figure 1:
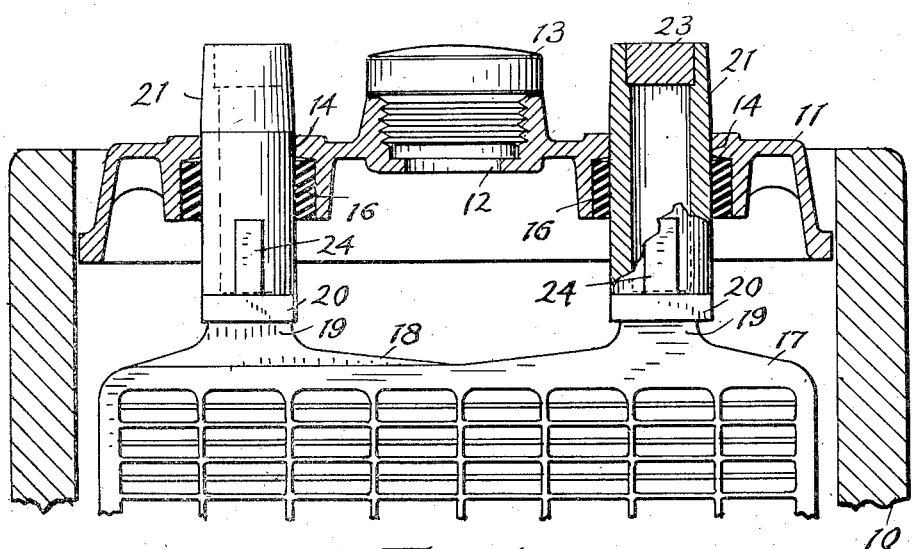
Fig. 1 is a side view of the complete head attached to a bearing.

The device comprises a casing or barrel 1 which may be of any suitable construction; shown as cylindric and provided at its lower end with a threaded nipple 1a and a rectangular portion 1b by which it can be easily turned by a wrench. Preferably the bottom of the casing is sealed or closed except for an axial bore 1c for passage of oil; and at the inner end of this bore is a valve seat 1d adapted to be engaged by the plunger valve hereinafter described.

The upper end of the casing is preferably closed by a removable cap 1e which preferably has a reduced externally threaded portion 1f adapted to engage internal threads in the upper end of the casing 1. Said cap may have an angular top portion 1g by which it can be forcibly screwed onto or off of the casing. The cap is also provided with a threaded bore for the engagement of an adjusting rod 6 hereinafter referred to.

Within the casing 1 is a plunger valve member which comprises a cylindric upper end portion 2 neatly but slidably fitted in the casing 1; a reduced valve portion 2a the lower end of which is adapted when in lowered position to seat upon the seat 1d and close the outlet 1c of the casing; and a reduced guide finger 2c below valve 2a adapted to loosely engage the bore 1c in the lower end of the casing and assist in guiding the valve member. The plunger valve member is provided with an axial bore 2d in part 2 and a reduced axial bore 2e in part 2a, and at the junction of the bores 2d, 2e with a valve seat 2f.

Figure 2:
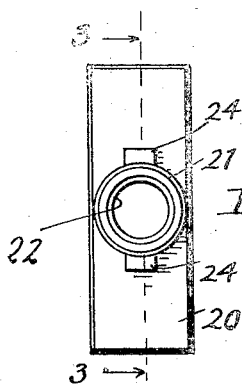
Fig. 2 is an enlarged vertical sectional view of the head, showing the parts in positions assumed when no pressure is exerted from the supply.
Figure 3:
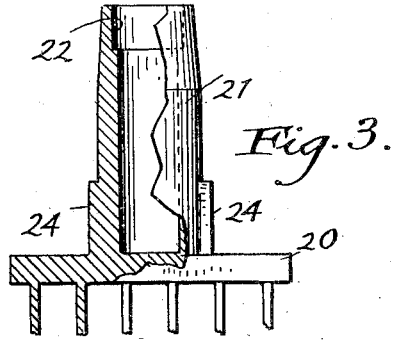
Fig. 3 is a similar view showing the parts in positions assumed when oil is being supplied to the head under pressure.

Within the bore 2d is slidably fitted a bypass valve 3 which can be seated upon the seat 2f. Below the valve seat 2f is a lateral opening 2g which when the valve 3 is unseated permits oil to flow from the upper portion of the casing above part 2 of the valve member into the chamber in the casing below said portion 2 of the said valve member. Valve 3 is normally closed by member 6 as shown in Fig. 2; but the valve 3 is opened or unseated by the action of a spring 4 housed within the bore 2e (except when the valve is held closed by abutment against member 6 or by the lubricant pressure) so that the oil can flow past valve 3 into the chamber below the portion 2 of the valve as shown in Fig. 4. The valve member is normally raised so as to unseat valve 2a and permit oil to flow from the casing by means of a helical expansion spring 5; which is interposed between the part 2a of the valve and the bottom of the casing.

The spring 5 is more powerful than the spring 4, spring 4 being sufficiently powerful to raise valve 3 from its seat, except when pressure is exerted by the grease gun; or when valve 3 abuts against stop 6; and the extent of upward movement of the plunger valve member and of the bypass valve 3 therein are regulable by means of an adjustable stop rod 6, which is tapped through the top 1e of the casing, and its inner end is adapted to engage the valve 3 as the